(12) United States Patent
Peloquin et al.

(10) Patent No.: US 6,441,114 B1
(45) Date of Patent: Aug. 27, 2002

(54) ADHESIVES FOR USE ON FLUORINE-CONTAINING OR POLYCARBONATE SURFACES

(75) Inventors: Richard L. Peloquin, Maplewood; Albert I. Everaerts, Oakdale; Ellen O. Aeling, St. Paul, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/330,923

(22) Filed: Jun. 11, 1999

(51) Int. Cl.$^7$ .................................................. C08F 18/10
(52) U.S. Cl. .............................. 526/307.2; 526/307.7; 526/303.1; 526/310; 526/312; 526/317.1; 526/318.3
(58) Field of Search ............................ 526/307.7, 310, 526/312, 317.1, 303.1, 318.3, 287, 307.2; 522/126, 168, 171, 173, 180, 182; 428/522

(56) References Cited

U.S. PATENT DOCUMENTS

| | | |
|---|---|---|
| RE24,906 E | 12/1960 | Ulrich |
| 3,299,010 A | 1/1967 | Samour ..................... 260/78 |
| 3,786,116 A | 1/1974 | Milkovich et al. |
| 3,842,059 A | 10/1974 | Milkovich et al. |
| 4,379,201 A | 4/1983 | Heilmann |
| 4,554,324 A | 11/1985 | Husman et al. |
| 4,605,592 A | 8/1986 | Paquette et al. |
| 4,619,979 A | 10/1986 | Kotnour et al. |
| 4,637,646 A | 1/1987 | Ellis |
| 4,737,559 A | 4/1988 | Kellen et al. |
| 4,775,219 A | 10/1988 | Appledorn et al. |
| 4,843,134 A | 6/1989 | Kotnour et al. |
| 4,943,461 A | 7/1990 | Karim |
| 4,985,488 A | 1/1991 | Landin |
| 5,106,673 A | 4/1992 | Effenberger et al. |
| 5,139,878 A | 8/1992 | Kim et al. |
| 5,334,686 A | 8/1994 | Ando et al. |
| 5,506,279 A | 4/1996 | Babu et al. |
| 5,512,316 A | 4/1996 | Dody et al. |
| 5,612,136 A | 3/1997 | Everaerts et al. |
| 5,612,316 A | 3/1997 | Koch |
| 5,637,646 A | 6/1997 | Ellis |
| 5,656,121 A | 8/1997 | Fukushi |
| 5,658,670 A | 8/1997 | Fukushi et al. |
| 5,804,610 A | 9/1998 | Hamer et al. |
| 5,827,608 A | 10/1998 | Rinehart et al. |
| 5,874,143 A | 2/1999 | Peloquin et al. |
| 5,905,099 A | 5/1999 | Everaerts et al. |

FOREIGN PATENT DOCUMENTS

| | | |
|---|---|---|
| DE | 1 594 069 | 7/1970 |
| EP | 0544933 A1 | 6/1993 |
| JP | 06-108025 A | 4/1994 |
| JP | 8143843 | 4/1996 |
| WO | WO 97/17411 | 5/1977 |
| WO | WO 97/31076 | 8/1997 |
| WO | WO 00/77177 A1 | 12/2000 |

OTHER PUBLICATIONS

Ito et al., "Syntheses of Methly Methacrylate–Stearyl Methacrylate Graft Copolymers and Characterization by Inverse Gas Chromatography", *Macromolecules* 13:216–221 (1980).

Fox, "Influence of Diluent and of Copolymer Composition on the Glass Temperature of a Polymer System", *Bull. Am. Phys. Soc.*, Ser. 2, Item No. J5, Session J, 1:123 (1956).

Satas, Handbook of Pressure Sensitive Adhesive Technology, 2$^{nd}$ Edition, Van Nostrand Reinhold, cover page, title page, table of contents.

Yamashita et al., "Synthesis of Amphiphilic Graftcopolymers from Polystyrene Macromonomer", *Polymer Journal* 14:255–260 (1982).

Pocius, Adhesion and Adhesives Technology An Introduction, "The Chemistry and Physical Properties of Elastomer–Based Adhesives," Ch. 9, Hanser/Gardner Publications, Inc., Cincinnati, OH, Title page and 3 pages (date unavailable).

Primary Examiner—David W. Wu
Assistant Examiner—Tatyana Zalukaeva
(74) Attorney, Agent, or Firm—Carolyn V. Peters (57) ABSTRACT

Adhesives useful in applying articles, such as tapes, labels, signs, decals, emblems, car moldings, protective or optical films, etc., to surfaces to which articles normally do not adhere well, such as surfaces containing fluorine and polycarbonate, for example. The adhesives include a copolymer of one or more monoethylenically unsaturated alkyl (meth)acrylate monomers, one or more monoethylenically unsaturated secondary or tertiary amide-functional monomers, and optionally one or more acidic monomers.

20 Claims, 1 Drawing Sheet

Fig. 1

ADHESIVES FOR USE ON FLUORINE-CONTAINING OR POLYCARBONATE SURFACES

FIELD OF THE INVENTION

This invention relates generally to adhesives, particularly adhesives that are useful on fluorine-containing or polycarbonate surfaces and, more specifically, to pressure sensitive adhesives that include a copolymer of one or more alkyl (meth)acrylate monomers, one or more amide-functional monomers, and optionally one or more acidic monomers.

BACKGROUND

Graphic marking films or labels that include vinyl films coated with acrylic pressure sensitive adhesives (PSAs) are well-known in the art. Such films are typically applied to plasticized polyvinylchloride substrates which may have a thin dirt- and chemical-resistant top coating. Such clear top coatings include fluorine-containing polymers, for example. One such product includes a clear top surface containing a blend of polymethylmethacrylate (PMMA) and a copolymer of vinylidenefluoride (VDF) and chlorotrifluoroethylene (CTFE). Typically, the higher the fluoropolymer content of such surfaces, the better the dirt repellancy. As long as this clear top surface includes a major amount of PMMA, adequate bond formation of a vinyl marking film is obtained using an acrylic PSA containing a copolymer of an alkylacrylate and acrylic acid (AA). This adhesive, however, does not work effectively on clear top surfaces that include a major amount of fluorine-containing polymer and a minor amount of PMMA or no PMMA. In general, the ability to provide such label and graphic marking films, or other articles, with high bonding strength to surfaces containing fluorine has not been generally possible without surface treatment of the substrate (e.g., chemical priming).

Similarly, it is difficult to adhere articles to substrate surfaces that include polycarbonates, or plasticized polymers such as polyvinylchloride.

There are a limited number of known adhesives, many of which are based on acrylate chemistry, that can be used, however. For example, U.S. Pat. No. 5,612,136 (Everaerts et al.) discloses acrylate-based (i.e., acrylic) pressure sensitive adhesive compositions that adhere well to acidic surfaces. The adhesive is prepared from an alkyl acrylate, wherein the alkyl group includes four or more carbon atoms, which is copolymerized with basic monomers, such as dialkyl substituted amides. Lower (less than C4) alkyl acrylates can be copolymerized with such monomers provided that the glass transition temperature (Tg) of the resultant polymer is below about −20° C. U.S. Pat. No. 5,905,099 (Everaerts et al.) discloses heat-activatable adhesive compositions prepared from a low Tg (homopolymer Tg of no greater than about 0° C.) alkyl acrylate, wherein the alkyl group includes two or more carbon atoms, a high Tg acrylate (homopolymer Tg of at least about 50° C.), such as a cycloalkyl or aromatic acrylate, and a polar functional monomer such as a carboxylic acid, an N-substituted amide, an N-substituted amine, and a carbamate. Weakly basic monomers, such as N,N-dimethyl acrylamide and N-vinyl pyrrolidone are disclosed as enhancing adhesion to plasticized and rigid polyvinylchloride. Acidic functional monomers, such as acrylic acid, are disclosed as enhancing adhesion to polar surfaces such as glass, metals, paint, and basic surfaces.

U.S. Pat. No. 4,985,488 (Landin) discloses a plasticizer-resistant acrylate-based adhesive prepared from nitrogen-containing alkyl acrylate monomers, wherein the alkyl group includes four or more carbon atoms. U.S. Pat. No. 5,334,686 (Ando et al.) discloses acrylate-based adhesives prepared from alkyl acrylates, wherein the alkyl group includes four or more carbon atoms, dialkyl-substituted acrylamides, and acids. JP 8-143843 (Nitto) discloses removable acrylate-based adhesives prepared from alkyl acrylates, wherein the alkyl group includes two or more carbon atoms, N,N-dialkyl acrylamides, and carboxylic acids. U.S. Pat. No. 4,605,592 (Paquette et al.) discloses plasticizer-resistant acrylate-based pressure sensitive adhesive compositions prepared from alkyl acrylates, wherein the alkyl group includes four or more carbon atoms, to prevent vinyl decorative graphics from wrinkling. JP 06-108025A (Nippon) discloses acrylate-based adhesives for bonding cellulose to glass without appearance defects. One example includes a copolymer of, for example, n-butyl acrylate, methyl acrylate, acrylic acid, and an amide such as N,N-dimethyl acrylamide, wherein the amide monomer is present in an amount of 0.3–10 weight percent of the copolymer.

There is still a need in the art for other adhesives that can be used to adhere articles to surfaces such as fluorine-containing or polycarbonate surfaces that do not typically demonstrate particularly good adhesion.

SUMMARY

This invention relates generally to adhesives useful for adhering articles to fluorine-containing or polycarbonate surfaces, for example. Preferably, adhesives of the present invention have an initial level of adhesion that allows an article to be removable and/or repositionable, but which builds to a greater level of permanency with time, heat, and/or pressure, for example. The adhesive may be pressure sensitive or heat activatable.

In one embodiment, a pressure sensitive adhesive (PSA) having a Tg of at least about −20° C. is provided. The PSA includes a copolymer comprising: at least one copolymerized monoethylenically unsaturated (meth)acrylic acid ester comprising an alkyl group having at least 4 carbons on average; at least one copolymerized monoethylenically unsaturated (meth)acrylic acid ester comprising an alkyl group having less than 4 carbons on average; and greater than 10 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group.

In another embodiment, the present invention provides an adhesive (which can be a pressure sensitive or heat activatable adhesive) having a Tg of at least about −20° C. that includes a copolymer comprising: at least one copolymerized monoethylenically unsaturated (meth)acrylic acid ester comprising an alkyl group having at least 4 carbons on average; at least one copolymerized monoethylenically unsaturated (meth)acrylic acid ester comprising an alkyl group having less than 4 carbons on average; and greater than 10 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group. In this embodiment, all of the copolymerized monoethylenically unsaturated (meth)acrylic acid esters of the copolymer have a Tg of less than about 50° C. as a homopolymer. Preferably, the copolymer further includes at least one copolymerized acidic monomer.

Preferably, a 50-micron thick polymeric plasticized vinyl film having a 35-micron thick layer of the adhesive disposed thereon has a 180° peel adhesion value of no greater than about 35 N/100 mm, measured at a 30.5 cm per minute peel rate, from a surface comprising an 80/20 polyvinylidenefluoride/polymethylmethacrylate blend after contact for 24 hours at 22° C. Preferably, if stored for 7 days at 66° C., the 80° peel adhesion value is at least about 70 N/100 mm.

In yet another embodiment, the present invention provides a pressure sensitive adhesive having a Tg of at least about –20° C. The PSA includes a copolymer comprising: at least one copolymerized monoethylenically unsaturated (meth)acrylic acid ester comprising an alkyl group having at least 4 carbons on average and which as a homopolymer has a Tg of less than about 0° C.; at least one copolymerized monoethylenically unsaturated (meth)acrylic acid ester comprising an alkyl group having less than 4 carbons on average and which as a homopolymer has a Tg of less than about 50° C.; and greater than 10 parts by weight, based on the total weight of monomers, at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group; wherein a 50-micron thick polymeric plasticized vinyl film having a 35-micron thick layer of the pressure sensitive adhesive disposed thereon has a 180° peel adhesion value of no greater than about 35 N/100 mm, measured at a 30.5 cm per minute peel rate, from a surface comprising an 80/20 polyvinylidenefluoride/polymethylmethacrylate blend after contact for 24 hours at 22° C., and after 7 days at 66° C. has a 180° peel adhesion value of at least about 70 N/100 mm, measured at a 30.5 cm per minute peel rate.

The present invention also provides an article comprising a substrate surface comprising a nonperfluorinated fluoropolymer derived from at least one hydrofluoro monomer, and an adhesive-coated article adhered thereto, and a method of adhering. The adhesive-coated article comprises a backing (e.g., a film or a foam), which has disposed on at least one major surface thereof an adhesive which is adhered to the substrate surface; wherein the adhesive comprises a copolymer comprising at least one copolymerized monoethylenically unsaturated (meth)acrylic acid ester (preferably, at least one copolymerized monoethylenically unsaturated (meth)acrylic acid ester comprising an alkyl group having less than 4 carbon atoms on average, and at least one copolymerized monoethylenically unsaturated (meth)acrylic acid ester comprising an alkyl group having at least 4 carbon atoms on average) and at least one copolymerized monoethylenically unsaturated monomer having a secondary or tertiary amide group. Preferably, the substrate surface further includes a polymethylmethacrylate blended with the nonperfluorinated fluoropolymer derived from at least one hydrofluoro monomer. In certain embodiments the copolymer further includes at least one copolymerized acidic monomer.

A further embodiment of the present invention is an article comprising a substrate surface comprising a polycarbonate and an adhesive-coated article adhered thereto, and a method of adhering. The adhesive-coated article comprises a backing (e.g., a film or a foam), which has disposed on at least one major surface thereof an adhesive which is adhered to the substrate surface; wherein the adhesive comprises a copolymer comprising: at least one copolymerized monoethylenically unsaturated (meth)acrylic acid ester (preferably, at least one copolymerized monoethylenically unsaturated (meth)acrylic acid ester comprising an alkyl group having less than 4 carbon atoms on average, and at least one copolymerized monoethylenically unsaturated (meth)acrylic acid ester comprising an alkyl group having at least 4 carbon atoms on average); and at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group. In certain embodiments the copolymer further includes at least one copolymerized acidic monomer.

A still further embodiment of the present invention is an article comprising a substrate surface comprising a plasticized polymer and an adhesive-coated article adhered thereto, and a method of adhering. The adhesive-coated article comprises a backing (e.g., a film or a foam), which has disposed on at least one major surface thereof an adhesive which is adhered to the substrate surface; wherein the adhesive has a Tg of at least about –20° C. and comprises a copolymer comprising: at least one copolymerized monoethylenically unsaturated (meth)acrylic acid ester comprising an alkyl group having less than 4 carbon atoms on average; at least one copolymerized monoethylenically unsaturated (meth)acrylic acid ester comprising an alkyl group having at least 4 carbon atoms on average; at least one copolymerized monoethylenically unsaturated monomer having a secondary or tertiary amide group; and at least one acidic monomer. In this embodiment, all of the copolymerized monoethylenically unsaturated (meth)acrylic acid esters of the copolymer have a Tg of less than about 50° C. as a homopolymer.

Methods of adhering an article to a substrate surface are also provided.

DETAILED DESCRIPTION OF PREFERRED EMBODIMENTS

This invention relates broadly to adhesives that are useful in applying articles, such as tapes, labels, signs, decals, emblems, car moldings, protective or optical films, etc., to surfaces to which articles normally do not adhere well. Typically and preferably, such surfaces contain fluorine, particularly nonperfluorinated fluoropolymers derived from monomers, at least one of which is a hydrofluoro monomer (i.e., a monomer of the formula (H)(X)C=C(Y)(Z) wherein at least one of X, Y, and Z is F, and otherwise is H, an alkyl, a perfluoroalkyl, or another halogen), optionally blended with another polymer such as polymethylmethacrylate. Another preferred surface to which it is difficult to adhere articles is polycarbonate. Alternatively, such surfaces may contain plasticized polymers, such as polyvinyl chloride, although this is not a preferred surface.

The adhesives of the present invention include a copolymer of one or more monoethylenically unsaturated alkyl (meth)acrylate monomers, one or more monoethylenically unsaturated secondary or tertiary amide-functional monomers, and optionally one or more acidic monomers. Such copolymers may or may not be crosslinked. Preferably, they form an adhesive that has a glass transition temperature (Tg) of at least about −20° C. Preferably, they are generally optically clear (i.e., able to be seen through without significant optical distortion) as well as removable and/or repositionable within an initial period of time, preferably within about 24 hours. As used herein, a "removable" adhesive is one that can be adhered to a substrate surface and the adhesive and backing can be simultaneously removed from the substrate without bond failure between the adhesive and the backing. A "repositionable" adhesive is one that can be applied and adhered to a substrate surface and then removed (generally within about 24 hours) and reapplied without distorting, defacing, or destroying the backing, adhesive, or substrate. The adhesion properties of the adhesives of the present invention preferably build with time, heat, and/or pressure such that they are capable of providing high levels of adhesion once the adhesive-coated article is in position.

Preferred adhesives are pressure sensitive, although heat-activatable adhesives are also possible. A pressure sensitive adhesive is conventionally understood to refer to an adhesive that displays aggressive tackiness to a wide variety of substrates after applying only light pressure. In contrast, heat-activatable adhesives may be applied to a substrate by simple heating of the adhesive at or above its Tg to make the bond. An accepted quantitative description of a pressure sensitive adhesive is given by the Dahlquist criterion, which indicates that materials having a storage modulus (G') of less than about $4.0 \times 10^5$ Pascals (measured at room temperature) have pressure sensitive adhesive properties while materials having a G' in excess of this value do not.

Preferred adhesive compositions and articles coated with such adhesive compositions of the invention provide relatively low initial adhesion but show acceptable levels of adhesion build such that the articles are initially removable and/or repositionable but become permanent (typically showing adhesion greater than about 90 N/100 mm for an indefinite period of time) once in position on a substrate surface. This adhesion build can result from the passage of time, the application of pressure, and/or the application of heat, for example.

Preferably and advantageously, adhesives of the present invention that have a generally smooth (i.e., nontextured) surface (which typically occurs upon coating the adhesive on a silicone-coated release liner, for example) when disposed at a thickness of about 35 microns on a 50-micron thick polymeric plasticized vinyl film display a 180° peel adhesion value of no greater than 35 N/100 mm, when measured at a 30.5 cm per minute peel rate from an 80/20 PVDF/PMMA substrate (i.e., a blend of 80 weight percent PVDF and 20 weight percent PMMA), after having been applied to the PVDF/PMMA substrate with a rubber roll laminator and stored for 24 hours at 22° C. For purposes of this peel adhesion test, the polymeric plasticized vinyl film has an elongation of 100% to 200% and a tensile strength of 22 Newtons to 35 Newtons per 2.54-cm width as measured by an Instron tensile tester. Although typically under such conditions preferred adhesives display a peel adhesion value of no greater than about 35 N/100 mm, certain preferred adhesives may exhibit a "shocky" or "slip/stick" peel phenomenon that result in measured average peel adhesion values greater than 35 N/100 mm yet still are removable and/or repositionable. It has been observed that adhesives with a glass transition temperature (Tg), as calculated by the Fox Equation (T. G. Fox, *Bull. Amer. Phys. Soc.*, Series 2, 1, 123 (1956), and Satas, Handbook of Pressure Sensitive Adhesive Technology, $2^{nd}$ Edition, Van Nostrand Reinhold), of about −20° C. or greater are preferred. Significantly, adhesive articles of the present invention, which have been applied to the PVDF/PMMA substrate and aged for 7 days in an oven at 66° C., can provide a final 180° peel adhesion of preferably at least about 70 N/100 mm, more preferably, at least about 100 N/1 00 mm, most preferably, at least about 150 N/100 mm, and often even higher, measured at a 30.5 cm per minute peel rate under the same test conditions described above. As used herein, a "24-hour" peel adhesion is determined after 24 hours at 22° C. and 50% relative humidity, and a "final" peel adhesion is determined after 7 days of storing in an oven at 66° C.

When adhered to a substrate that includes a plasticized polymer layer, such as a polyvinyl chloride, preferred adhesives of the present invention display a T-peel adhesion value of at least about 35 N/100 mm (measured at a 30.5 cm per minute peel rate), when a 35 micron thick adhesive layer coated onto a 50-micron thick polymeric plasticized vinyl film (as described above for the 180° peel test) is applied to a polyvinyl chloride substrate (available under the trade designation Duraskin 070 Blue PVC Coated Polyester Style #B129334 from Verseidag of Krefeld, Germany and stored for 24 hours at 22° C. Such preferred adhesives of the present invention substantially retain, if not further increase, their T-peel adhesion values over a period of at least about 7 days, and more preferably, at least about 3 weeks of storing in an oven at 66° C.

Preferably and advantageously, adhesive articles of the present invention can provide good shear resistance, as demonstrated by film shrinkage of less than 250 microns as measured by the test method listed in the Testing Protocol.

Highly preferred embodiments of the invention exhibit these attributes to several, and most preferably, to all of the substrate surfaces mentioned above.

Amide-Functional Adhesives

Adhesive compositions useful in the invention comprise and, more preferably, consist essentially of, a copolymer of (i.e., a copolymer derived from) at least two different types of monoethylenically unsaturated monomers, at least one of which includes secondary or tertiary amide functionality. The copolymer is preferably a copolymer of at least one type of copolymerizable acrylate monomer and at least one type of copolymerizable secondary or tertiary amide-functional monomer. The copolymer is more preferably a copolymer of at least two different types of copolymerizable acrylate monomers and at least one type of copolymerizable secondary or tertiary amide-functional monomer. Optionally, the copolymer is also derived from a copolymerizable acidic monomer.

Thus, a "copolymer," as used herein, includes a polymer of two or more types of polymerizable monomers, and therefore includes terpolymers, tetrapolymers, etc. This can include random copolymers, block copolymers, or sequential polymers.

The monomers can include (A) a monoethylenically unsaturated (meth)acrylic ester wherein the alkyl group has at least 4 carbons (on average), (B) a monoethylenically unsaturated (meth)acrylic ester wherein the alkyl group has less than 4 carbons (on average), (C) a monoethylenically unsaturated monomer having a secondary or tertiary amide group, and (D) an acidic monomer. Various combinations of these four types of monomers can be used as long as monomer C and at least one of monomer A or B is present. For example, polymers can be made from A, B, and C, or A and C, or B and C, or A, B, C, and D, or A, C, and D, or B, C, and D. In preferred embodiments, when monomer D is present, monomer C is present in a molar excess relative to monomer D.

Preferably, the monomers include:(A) a monoethylenically unsaturated (meth)acrylic acid ester (i.e., an alkyl acrylate or alkyl methacrylate), wherein the alkyl group has at least 4 carbon atoms (on average) and which as a homopolymer has a Tg of less than about 0° C.; (B) a monoethylenically unsaturated (meth)acrylic ester, wherein the alkyl group has less than 4 carbon atoms (on average) and which as a homopolymer has a Tg of less than about 50° C.; (C) a monoethylenically unsaturated monomer having a secondary or tertiary amide group; and (D) an acidic monomer.

Monomer A is a monoethylenically unsaturated (meth) acrylic acid ester (i.e., an alkyl acrylate or methacrylate), wherein the alkyl group has at least 4 carbon atoms (on average). Preferably, the alkyl group of the (meth)acrylate has about 4 to about 14 carbon atoms (on average). The alkyl group can optionally contain heteroatoms and can be linear or branched. Preferably, when homopolymerized, these monomers yield inherently tacky polymers with glass transition temperatures which are typically less than about 0° C. Preferred such (meth)acrylate monomers have the following general formula:

wherein $R^1$ is H or $CH_3$, the latter corresponding to where the (meth)acrylate monomer is a methacrylate monomer, and $R^2$ is broadly selected from linear or branched organic groups optionally including one or more heteroatoms. The number of carbon atoms in the $R^2$ group is preferably about 4 to about 14, and more preferably about 4 to about 8.

Examples of monomer A include, but are not limited to, 2-methylbutyl acrylate, isooctyl acrylate, isooctyl methacrylate, lauryl acrylate, 4-methyl-2-pentyl acrylate, isoamyl acrylate, sec-butyl acrylate, n-butyl acrylate, n-hexyl acrylate, 2-ethylhexyl acrylate, 2-ethylhexyl methacrylate, n-octyl acrylate, n-octyl methacrylate, 2-methoxy-ethyl acrylate, 2-ethoxy-ethyl acrylate, n-decyl acrylate, isodecyl acrylate, isodecyl methacrylate, and isononyl acrylate. Preferred (meth)acrylates that can be used as monomer A include isooctyl acrylate, 2-ethyl hexyl acrylate, 2-methylbutyl acrylate, and n-butyl acrylate. Combinations of various monomers categorized as an A monomer can be used to make the copolymer of the present invention.

Monomer B is a monoethylenically unsaturated (meth) acrylic acid ester (i.e., an alkyl acrylate or methacrylate), wherein the alkyl group has less than 4 carbon atoms (on average). Preferably, the alkyl group of the (meth)acrylate has about 1 to about 2 carbon atoms (on average). The alkyl group can optionally contain heteroatoms and can be linear or branched. Preferably, when homopolymerized, these monomers yield essentially non-tacky polymers with a Tg of less than about 50° C. Preferred (meth)acrylate monomers have the following general formula:

wherein $R^1$ is H or $CH_3$, and $R^2$ is broadly selected from linear or branched hydrocarbon groups and optionally including one or more heteroatoms. The number of carbon atoms in the $R^2$ group is preferably 1 or 2.

Examples of monomer B include, but are not limited to, methyl acrylate, ethyl acrylate, propyl acrylate, and propylmethacrylate. Preferred (meth)acrylates that can be used as monomer B include methyl acrylate and ethylacrylate. Combinations of various monomers categorized as a B monomer can be used to make the copolymer of the present invention.

Monomer C is a monoethylenically unsaturated monomer having a secondary or tertiary amide group, preferably, a secondary or tertiary amide group of the formula —C(O)NR$^1$R$^2$ wherein $R^1$ and $R^2$ are each independently H or a saturated or unsaturated hydrocarbon moiety (i.e., a group that includes only carbon and hydrogen and not nitrogen or oxygen, for example), which optionally can form a ring with the carbonyl carbon (—C(O)) of the amide group.

Examples of monomer C include, but are not limited to: N-alkylated (meth)acrylamides, such as, N-methyl acrylamide, N-ethyl acrylamide, N,N-dimethyl acrylamide, N,N-dimethyl methacrylamide, N,N-diethyl acrylamide, N,N-diethyl methacrylamide, N-isopropyl acrylamide, t-butyl acrylamide, N-octyl acrylamide, 4-(N,N-dimethylamido) butylacrylate; N-vinyl lactams, such as, N-vinyl pyrrolidone, N-vinyl caprolactam; and N-vinyl formamide. Preferred monomers that can be used as monomer C are N,N-dimethyl acrylamide, N,N-diethyl acrylamide, N-vinyl pyrrolidone, and N-vinyl caprolactam. Combinations of various monomers categorized as a C monomer can be used to make the copolymer of the present invention.

Monomer D is preferably a copolymerizable acidic monomer selected from the group of ethylenically unsaturated carboxylic acids, ethylenically unsaturated sulfonic acids, and ethylenically unsaturated phosphonic acids. Examples include, but are not limited to, acrylic acid, methacrylic acid, itaconic acid, fumaric acid, crotonic acid, citraconic acid, maleic acid, beta-carboxyethyl acrylate, 2-sulfoethyl methacrylate, and vinyl phosphonic acid. Preferred monomers that can be used as monomer D include acrylic acid, methacrylic acid, and beta-carboxyethyl acrylate. Combinations of various monomers categorized as a D monomer can be used to make the copolymer of the present invention.

Monomers A, B, C, and D can be used in amounts to produce a copolymer having properties as defined above. Preferably, when adhesive removability and/or repositionability is desired, monomer B is used as part of the composition. All parts referred to herein are weight percent of the total weight of the monomers, unless otherwise specified.

Preferably, monomer A is present in an amount of at least about 5 parts by weight, and more preferably, at least about 10 parts, based on the total weight of monomers in a copolymerizable mixture. Preferably, it is present in an amount of no greater than about 95 parts, more preferably no greater than about 80 parts, and most preferably, no greater than about 70 parts, based on the total weight of monomers in a copolymerizable mixture.

Preferably, monomer B is present in an amount of no greater than about 90 parts by weight, and more preferably, no greater than about 80 parts, based on the total weight of monomers in a copolymerizable mixture. Preferably, it is present in an amount of at least about 20 parts, and more preferably, greater than about 20 parts, based on the total weight of monomers in a copolymerizable mixture.

Preferably, monomer C is present in an amount of no greater than about 50 parts by weight, more preferably, no greater than about 40 parts, and most preferably, no greater than about 25 parts, based on the total weight of monomers in a copolymerizable mixture. Preferably, monomer C is present in an amount of at least about 5 parts, more preferably, at least about 10 parts, and most preferably, greater than about 10 parts, based on the total weight of monomers in a copolymerizable mixture.

Preferably, monomer D is present in an amount of no greater than about 10 parts by weight, and more preferably, no greater than about 5 parts, based on the total weight of monomers in a copolymerizable mixture. If monomer D is present, it is preferably present in an amount of at least about 2 parts, based on the total weight of monomers in a copolymerizable mixture.

In particularly preferred embodiments, the monomers can be used in amounts of about 5 parts to about 80 parts of monomer A, greater than 20 parts to about 90 parts of monomer B, about 10 parts to about 50 parts of monomer C, and about 0 parts to about 10 parts of monomer D.

For preferred compositions having desired removability and/or repositionability, the amounts of these monomers are selected to provide a composition having a glass transition temperature (Tg) of at least about −20° C. Such compositions typically include monomer C in an amount of greater than 10 parts to about 25 parts, and monomer D in an amount of about 2 parts to about 5 parts, with the balance being monomer A and/or B selected to provide a Tg of at least about −20° C. The glass transition temperatures of the homopolymers and copolymer are typically accurate to within ±5° C. and are measured by differential scanning calorimetry.

For certain other preferred compositions, monomers A, B, and C are present, with monomer C being present in an amount of greater than 10 parts. In still other embodiments, the monomers can be used in amounts of about 10 parts to about 70 parts of monomer A, about 20 parts to about 80 parts of monomer B, greater than 10 parts to about 40 parts of monomer C, and about 2 parts to about 5 parts of monomer D.

In order to improve shear or cohesive strength, control elastic modulus, and preadhesion tack, for example, of the adhesives of the present invention, the copolymers can be crosslinked. Preferably, the crosslinking agent is one that is copolymerized with the monomers. The crosslinking agent may produce chemical crosslinks (e.g., covalent bonds). Alternatively, it may produce physical crosslinks that result, for example, from the formation of reinforcing domains due to phase separation or acid base interactions. Suitable crosslinking agents are disclosed in U.S. Pat. Nos. 4,379,201 (Heilman), 4,737,559 (Kellen), 5,506,279 (Babu et al.), and 4,554,324 (Husman). Combinations of various crosslinking agents can be used to make the copolymer used in making the fibers of the present invention. It should be understood, however, that such crosslinking agents are optional.

Such crosslinking agents also include thermal crosslinking agents such as a multifunctional aziridine, for example. One example is 1,1'-(1,3-phenylene dicarbonyl)-bis-(2-methylaziridine), referred to herein as "bisamide." Such chemical crosslinkers can be added into solvent-based adhesives containing acid functionality after polymerization and activated by heat during oven drying of the coated adhesive.

Other suitable crosslinking agents include chemical crosslinkers that rely upon free radicals to carry out the crosslinking reaction. Reagents such as peroxides, for example, serve as a precursor of free radicals. When heated sufficiently, these precursors will generate free radicals that bring about a crosslinking reaction of the polymer chains. A common free radical generating reagent is benzoyl peroxide. Free radical generators are required only in small quantities, but generally require higher temperatures to complete the crosslinking reaction than those required for the bisamide reagent.

Still other suitable crosslinking agents include photosensitive crosslinkers that are activated by high intensity ultraviolet (UV) light. Two examples are benzophenone and 4-acryloxybenzophenone, the latter being a monomer which is copolymerized into the adhesive copolymer. Another photocrosslinker, which can be post-added to a solution polymer and activated by UV light is a triazine, such as, for example, 2,4-bis(trichloromethyl)-6-(4-methoxy-phenyl)-s-triazine. These crosslinkers are activated by UV light generated from artificial sources such as medium pressure mercury lamps.

Aside from thermal or photosensitive crosslinkers, crosslinking may also be achieved using high energy electromagnetic radiation such as gamma or e-beam radiation, for example.

A physical crosslinking agent may also be used. In one embodiment, the physical crosslinking agent is a high Tg macromer such as those based upon polystyrene and polymethylmethacrylate. Such vinyl-terminated polymeric crosslinking monomers are sometimes referred to as macromolecular monomers (i.e., "macromers"). Such monomers are known and may be prepared by the methods disclosed in U.S. Pat. Nos. 3,786,116 (Milkovich et al.) and 3,842,059 (Milkovich et al.), as well as Y. Yamashita et al., *Polymer Journal*, 14, 255–260 (1982), and K. Ito et al., *Macromolecules*, 13, 216–221 (1980). Typically, such monomers are prepared by anionic polymerization or free radical polymerization.

Diisocyanates and moisture activated crosslinkers, such copolymerizable alkoxysilanes, may also be used as crosslinking agents. The adhesives may be crosslinked before or after bonding of the article to a substrate.

If used, the crosslinking agent is used in an effective amount, by which is meant an amount that is sufficient to cause crosslinking of the pressure sensitive adhesive to provide adequate cohesive strength to produce the desired final adhesion properties to the substrate of interest. Preferably, if used, the crosslinking agent is used in an amount of about 0.1 part to about 10 parts, based on 100 parts of monomers.

Optionally, the compositions of the present invention can include plasticizers, tackifiers, antioxidants, UV light absorbers, fillers, colorants, etc.

Backings

In one embodiment of the present invention, backings of plasticized, flexible polyvinylchloride films are used to form decorative films, labels or graphic marking films. These films may be made by casting from organosol solutions or calendered from an extrudable PVC resin.

Other backings of interest include, but are not limited to, polyesters, polyolefins, papers, foils, poly(meth)acrylates, polyurethanes, perfluoropolymers, polycarbonates, ethylene vinyl acetates, and the like. These backings may be primed (e.g., chemical coating, corona, flame, etc.) prior to application of the adhesive. Woven and nonwoven sheets, woven and nonwoven fabrics, foams (e.g., acrylic or polyethylene foams), and the like, are intended to be included. Preferably, the backing is a film (i.e., a thin, flexible, single- or multilayer polymeric sheet) or a foam.

The adhesives of the current invention may also be coated on release liners, such as siliconized paper or polymeric film. These adhesives can be transferred to any desired surface for subsequent bond making between two substrates.

Method of Making Adhesives

The adhesive can be polymerized by a wide variety of conventional free radical polymerization methods, including solution, emulsion, bulk, and suspension processes.

In one solution polymerization method, the alkyl (meth)acrylate monomers, amide-functional monomers, and optional acidic monomers, along with a suitable inert organic solvent, and free radically copolymerizable crosslinker, if used, are charged into a four-neck reaction vessel which is equipped with a stirrer, a thermometer, a condenser, an addition funnel, and a temperature controller. After this monomer mixture is charged into the reaction vessel, a concentrated thermal free radical initiator solution is added to the addition funnel. The whole reaction vessel and addition funnel and their contents are then purged with nitrogen to create an inert atmosphere. Once purged, the solution within the vessel is heated to decompose the added thermal initiator, and the mixture is stirred during the course of the reaction. A conversion of about 98 percent to about 99 percent is typically obtained in about 20 hours. If desired, solvent can be removed to yield a hot melt coatable adhesive.

Another polymerization method is the ultraviolet (UV) radiation initiated photopolymerization of the monomer mixture. This composition, along with suitable photoinitiator and crosslinker, is coated onto a flexible carrier web and polymerized in an inert, i.e., oxygen-free, atmosphere, such as a nitrogen atmosphere, for example. A sufficiently inert atmosphere can be achieved by covering a layer of the photoactive coating with a plastic film that is substantially transparent to ultraviolet radiation, and irradiating through that film in air using fluorescent-type ultraviolet lamps that generally give a total radiation dose of about 500 milliJoules/cm$^2$.

Solventless polymerization methods, such as the continuous free radical polymerization in an extruder described in U.S. Pat. Nos. 4,619,979 (Kotnour, et al.) and 4,843,134 (Kotnour, et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer, et al.) may also be utilized to prepare the polymers.

Initiators such as free radical initiators and photoinitiators can be used. Suitable thermal free radical initiators that can be utilized include, but are not limited to, those selected from the group consisting of azo compounds such as 2,2'-azobis(isobutyronitrile), hydroperoxides such as tert-butyl hydroperoxide, and peroxides such as benzoyl peroxide and cyclohexanone peroxide. Suitable photoinitiators that are useful according to the invention include, but are not limited to, those selected from the group consisting of the benzoin ethers such as benzoin methyl ether or benzoin isopropyl ether, substituted benzoin ethers such as anisole methyl ether, substituted acetophenones such as 2,2-diethoxyacetophenone and 2,2-dimethoxy-2-phenyl acetophenone, substituted alpha-ketols such as 2-methyl-2-hydroxy propiophenone, aromatic sulfonyl chlorides such as 2-naphthalene sulfonyl chloride, and photoactive oximes such as 1-phenyl- 1,1-propanedione-2-(O-ethoxycarbonyl)-oxime. For both thermal and radiation induced polymerizations, the initiator is present in an amount of about 0.05 percent by weight to about 0.5 percent by weight based upon the total weight of the monomers.

Suitable inert organic solvents, if required, may be any organic liquid which is inert to the reactants and product and will not otherwise adversely affect the reaction. Such solvents include ethyl acetate, acetone, methyl ethyl ketones, and mixtures thereof. The amount of solvent is generally about 30 percent by weight to about 80 percent by weight based on the total weight of the reactants (monomer, crosslinker, initiator) and solvent.

The adhesive compositions of the present invention may then be applied to a backing by a variety of coating methods brush, roll, spray, spread, wire, gravure, transfer roll, air knife, or doctor blade coating.

If the composition includes a solvent or water, it is then dried at a temperature (e.g., about 65° C. to about 120° C.) and a time (e.g., several minutes to about one hour) so as to provide an adhesive tape, for example. The thickness of the layer of adhesive may vary over a broad range of about 10 microns to several hundred microns (e.g., about 200 microns).

The adhesives may be applied by hot-melt coating the adhesive onto a sheet material or another suitable substrate. The adhesives can be hot melt coated by using a heated extruder, bulk tank melter, melt-on-demand equipment, or a hand-held hot melt adhesive gun. The hot melt adhesive can be delivered out of a film die and subsequently coated by contacting the drawn adhesive with a moving plastic web or other suitable substrate. A related coating method involves extruding the adhesive and a coextruded backing material from a film die and cooling the layered product to form a pressure sensitive adhesive tape. Other forming methods involve directly contacting the hot melt adhesive to a rapidly moving plastic web or other suitable preformed substrate. Using this method, the adhesive is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Once the adhesive composition has been coated, and optionally crosslinked, the adhesive surface of the article may, optionally, be protected with a temporary, removable release liner (i.e., protective liner) such as a polyolefin (e.g., polyethylene or polypropylene) or polyester (e.g., polyethylene terephthalate) film, or a plastic film. Such films may be treated with a release material such as silicones, waxes, fluorocarbons, and the like.

Film Constructions

The present invention has particular applicability in connection with vinyl films for graphic marking film and labels, although other adhesive articles are also possible, such as foam tapes, and the like. In one embodiment of a graphic marking film or label, the vinyl film can be an extendible polyvinylchloride backing for use in decorative labels and graphic marking films.

Figure 1:
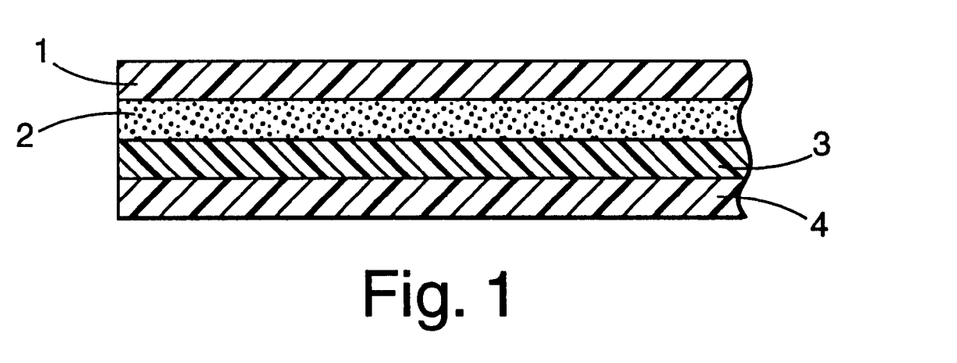
FIG. 1 is a schematic representation of the cross-section of a vinyl film label or graphic applied to a plasticized vinyl substrate which has a dirt and chemical resistant top coating.

A typical applied film construction is shown in FIG. 1 in which the film 1 comprises a film layer, such as a 2 mil (0.05 mm) vinyl film, which can be a decorative film, having an adhesive of the present invention 2 applied to one surface thereof. The adhesive 2 is applied to a substrate containing two layers, one of which is a fluoropolymer-containing top layer 3, such as a PVDF/PMMA blend, which can provide stain and/or chemical resistance and may also act as a barrier for plasticizer migration, and the other is a support layer 4, such as a plasticized vinyl film. Alternatively, the substrate may be a polycarbonate sheet or panel, replacing both the fluoropolymer top layer 3 and the plasticized vinyl support layer 4.

Graphic film constructions of the type depicted in FIG. 1 are useful in many outdoor applications including, but not limited to, architectural flexible and rigid signs.

Furthermore, the adhesives described herein can be used in such constructions as well as in retroreflective sheeting, light management films such as light enhancement films and privacy films. Also, when microreplicated film with optical properties such as that described in U.S. Pat. No. 4,775,219 (Appledorn et al.) is laminated, for example, adhesives of the present invention can be used in the lamination as they are optically clear so as to leave the microreplicated films with the intended optical quality. The adhesive may also be used to securely adhere articles against hydrofluoropolymers (and blends thereof with other polymers) as used in dirt repellant or chemically resistant surfaces used in artistic coatings, automotive paints, hoses, and the like.

The adhesives of the current invention may also be useful in applications requiring high adhesion to polycarbonate. These may include bonding of digital video disks (DVD), application of labels thereto, and application of dirt-repellant or other overlay films to polycarbonate panels and sheets. These overlay films may provide additional functionality to the underlaying polycarbonate, such anti-dew properties, resistance to graffiti, enhanced resistance to scratching or impact, and the like.

EXAMPLES

The invention will be more fully appreciated with reference to the following non-limiting examples. The examples were evaluated with respect to certain test methods that are described below. All dimensions given in the test methods and the examples are nominal dimensions. The abbreviations used herein are set for the in Table 1.

TABLE 1

| Abbreviations and Sources of Reagents | | | | | |
|---|---|---|---|---|---|
| IOA | Isooctyl acrylate | Sartomer, Exton, PA | PMMA | Polymethylmethacrylate | Zeneca Resins, Wilmington, MA |
| 2-MBA | 2-methylbutyl acrylate | Aldrich Chemical, Milwaukee, WI | PANAFLEX 930 | Flexible sign substrate | 3M, St Paul, MN |
| MA | Methyl acrylate | Aldrich Chemical | PANAFLEX 945 | Flexible sign substrate | 3M, St Paul, MN |

TABLE 1-continued

Abbreviations and Sources of Reagents

| | | | | | |
|---|---|---|---|---|---|
| EA | Ethyl acrylate | Aldrich Chemical | DURASKIN | 070 Blue PVC Coated Style #B129334 | Verseidag, Krefeld, Germany, |
| BA | n-butyl acrylate | Aldrich Chemical | FEP | Fluoroethylenepropylene polymer | Dyneon, Oakdale, MN |
| NOAcm | N-octyl acrylamide | National Starch & Chemical, Salisbury, NC | ETFE | Ethylenetetrafluoroethylene polymer | Dyneon |
| NNDMA | N,N-dimethyl acrylamide | Aldrich Chemical | TFE | Tetrafluoroethylene polymer | Dyneon |
| NVP | N-vinyl pyrrolidone | Aldrich Chemical | TEDLAR | Polyvinylfluoride | Dupont, Wilmington, DE |
| NVC | N-vinyl caprolactam | Aldrich Chemical | LEXAN | Polycarbonate | GE Plastics, Schenectady, NY |
| AA | Acrylic acid | Aldrich Chemical | | | |
| ABP | 4-acryloxybenzophenone | | CTH | Constant temperature humidity | |
| PVDF | Polyvinylidenefluoride | Ausimont USA, Thorofare, NJ | Tg | Glass transition temperature | |
| HYLAR FXH | Vinylidene fluoride hexafluoropropylene copolymer | Ausimont USA | N/dm | Newtons per decimeter | |

Preparation of Adhesives

A 250 milliliter (ml) round bottom flask was equipped with a stirrer, a condenser, and an addition funnel. A 40 gram (g) monomer mix consisting of the desired monomer ratios, listed as Examples C and 1–14 in the tables below, 0.04 gram ABP photocrosslinker, 0.04 gram isooctylthioglycolate (chain-transfer agent), and 50 grams of ethyl acetate were charged into this flask and a solution of 0.12 gram of VAZO 64 (2,2'-azobis(isobutyronitrile), an initiator commercially available from DuPont, Willmington, Del.) in 10 grams ethyl acetate was added to the addition funnel. This reaction apparatus was then inerted with nitrogen and the flask contents were heated to 55° C. The initiator solution was added to the flask and the temperature was maintained at 55° C. for about 20 hours. The sample was allowed to cool to room temperature. The cooled solution was then coated to form a dry coating thickness of about 35 microns on a siliconized release liner (POLYSLIK liner available from Rexam, South Hadley, Mass.) and oven dried for 10 minutes at 66° C. The adhesive of Example 15 was prepared according to the procedure of Example 1 in U.S. Pat. No. 4,364,972 (Moon) except 68/32 IOA/NVC was substituted for 70/30 IOA/NVP. The adhesive was subsequently laminated to a 50 micron vinyl film backing having an elongation of 100% to 200% and a tensile strength of 22 Newtons to 35 Newtons per 2.54-cm width as measured on an Instron tensile tester at 23° C. and 50% relative humidity using a crosshead speed of 30.5 cm/minute. Adequate shear performance, as measured by applied film shrinkage, was obtained by exposing adhesive samples, containing 4-acryloxybenzophenone crosslinker, to 500 milliJoules/cm² UV energy from a medium pressure mercury lamp.

Preparation of Test Substrate

The PVDF/PMMA powder coated test surfaces in Table 3 were made as described in Example 11 of U.S. Pat. No. 5,827,608 (Rinehart, et al.).

Test substrates (layers 3 and 4 in FIG. 1) in Tables 4 and 5 were prepared by extruding, using a twin-screw extruder, at temperature of approximately 200° C., an 80:20 PVDF/PMMA polymer blend onto a casting liner to a film thickness of 5 microns to 10 microns. The casting liner had a 60° gloss of about 12 to about 20 measured according to ASTM D523-85 using a BYK Gardner Glossgard II gloss meter (Rivershank, Ill.). The extruded film was subsequently hot laminated to 3M PANAFLEX 930 film at a temperature of 175° C., a pressure of 525 Newtons per centimeter, and a line speed of 4 meters per minute.

Testing Protocols

180° Peel Adhesion PSTC-1: The data in Tables 1–7 was based on Pressure Sensitive Tape counsel (PSTC) test standard. In this test, a 2.54 centimeter (cm) wide strip of PSA-coated 50-micron thick polymeric plasticized vinyl was laminated to the PVDF/PMMA test substrate described above, a fluoropolymer panel, or polycarbonate panel using a 2 kilogram rubber covered roller. The test specimens were backed with a standard 35-micron thick psa coated 50-micron thick polymeric plasticized vinyl film (having an elongation from 100% to 200% and a tensile from 22 Newtons to 35 Newtons per 2.54 cm width as measured by an Instron tensile tester) for reinforcement. The applied test specimen was allowed to equilibrate for 24 hours at 22° C. and 50% relative humidity and also oven aged at 7 days at 66° C. The test sample was then peeled at an angle of 180° and at a speed of 30.5 centimeters per minute using a Instron peel test machine. The peel adhesion measurement was reported in Newtons per 100 millimeters width (N/100 mm).

T-Peel Adhesion: For the data in Table 8, a 2.54 cm wide strip of PSA-coated 50-micron thick polymeric plasticized vinyl was laminated to a non-rigid or flexible test substrate (Duraskin 070 Blue PVC Coated Polyester Style #B129334 from Verseidag of Krefeld, Germany) using 2 firm swipes of a PA-1 squeegee available from 3M Company. The applied test specimen was allowed to equilibrate for 24 hours at 22° C. and 50% relative humidity and also oven aged at 7 days at 66° C. One end of the PSA coated film sample was clamped into the upper jaw of an Instron peel test machine and one end of the flexible substrate was clamped in the lower jaw. The test sample was then peeled at an angle of 180° and at a speed of 30.5 centimeters per minute using a Instron peel test machine. The peel adhesion measurement was reported in Newtons per 100 millimeters width (N/100mm).

Film Shrinkage: This test is used to measure internal adhesive or shear strength. It relates directly to actual product use conditions. This test measures the ability of the adhesive to "hold the vinyl film in place" or to resist the shinkage forces imparted by the vinyl film. A 6.35 cm by 10.2 cm adhesive coated 50 micron vinyl film sample (as described in the 180 peel adhesion test) sample was applied to an ED-2.75×11 aluminum panel from Q-Panel Lab Products, Cleveland, Ohio. The applied vinyl film sample was slit with a razor blade in both the crossweb and machine direction and was conditioned at 65.5° C. for 24 hours. Measurements in 25 micron increments of the razor cut openings were recorded. The razor slit tends to separate or widen for adhesives with poor internal or cohesive strength. Generally a gap opening of 250 microns or greater indicates that the adhesive has poor shear strength while adhesives that have good shear or cohesive strength will show small gap openings, less than 250 microns, and will hold the vinyl film in place.

EXAMPLES

Table 2 compares 180° peel adhesion values for 24-hour constant temperature and constant humidity aged (CTH at 22° C./50% R.H.) samples and 7-day heat aged (66° C.) samples of the control adhesive (Example C) compared to the new adhesive composition (Example 1) on surfaces comprised of a blend of an acrylic polymer and a fluoropolymer. Comparison between aging conditions shows that Example 1 has low adhesion, measured after 24 hour at 22° C., for good fabrication characteristics, and substantially builds and maintains adhesion on the acrylic polymer/fluoropolymer blend surface. Adhesion values denoted with "s" indicate shocky or slip/stick peel behavior as described in Satas, Handbook of Pressure Sensitive Adhesive Technology, $2^{nd}$ Edition, Van Nostrand Reinhold page 68.

TABLE 2

180° Peel Adhesion to substrates with Fluoropolymer Containing Top Surfaces

| Ex. | Adhesive | Test Substrate | Tg °C. | 24 Hour CTH | 1 Week 66° C. |
|---|---|---|---|---|---|
| C | 90/10 2-MBA/AA | 3M PANAFLEX 945 | −20 | 25 | 69 |
| C | 90/10 2-MBA/AA | 3M SCOTCHCAL 3640 | −20 | 61s | 73 |
| 1 | 52/26/20/2 EA/BA/NNDMA/AA | 3M PANAFLEX 945 | −15 | 51 | 211 |
| 1 | 52/26/20/2 EA/BA/NNDMA/AA | 3M SCOTCHCAL 3640 | −15 | 35s | 163 |

All adhesions at 180° angle, 30.5 cm/minute rate, units of N/100 mm.

Table 3 illustrates the difference in adhesion performance between the control adhesive (Example C) and the new adhesive (Example 1) on the PVDF/PMMA surface which has been powder coated (U.S. Pat. No. 5,827,608, Rinehart, et al.) onto a plasticized vinyl substrate at varying levels of PVDF content in the PVDF/PMMA polymer blend. Note that the control samples show the expected decrease in 1 week 66° C. adhesion as the amount of fluoropolymer increases in the blend. Surprisingly, the adhesives of the current invention show an increase in 1 week 66° C. adhesion values as the amount of the PVDF polymer is increased in the blend.

Table 4 shows that the 66° C. heat age adhesion values decrease as the level of NNDMA is decreased in the adhesive composition. Thus, surprisingly, as the amount of NNDMA increased the ultimate level of adhesion increased.

TABLE 3

180° Peel Adhesion to Powder-coated PVDF/PMMA Top Surface

| Ex. | Adhesive | Fluoropolymer Top Surface | Tg °C. | 24 Hour CTH | 1 Week 66° C. |
|---|---|---|---|---|---|
| C | 90/10 2-MBA/AA | 100/0 HYLAR FXH/PMMA Blend | −20 | 23s | 55 |
| C | 90/10 2-MBA/AA | 90/10 HYLAR FXH/PMMA Blend | −20 | 23s | 55 |
| C | 90/10 2-MBA/AA | 80/20 HYLAR FXH/PMMA Blend | −20 | 26s | 63 |
| C | 90/10 2-MBA/AA | 70/30 HYLAR FXH/PMMA Blend | −20 | 28s | 63 |
| 1 | 52/26/20/2 EA/BA/NNDMA/AA | 100/0 HYLAR FXH/PMMA Blend | −15 | <10 | 211 |
| 1 | 52/26/20/2 EA/BA/NNDMA/AA | 90/10 HYLAR FXH/PMMA Blend | −15 | 7s | 192 |
| 1 | 52/26/20/2 EA/BA/NNDMA/AA | 80/20 HYLAR FXH/PMMA Blend | −15 | 17s | 153 |
| 1 | 52/26/20/2 EA/BA/NNDMA/AA | 70/30 HYLAR FXH/PMMA Blend | −15 | 30 | 123 |

All adhesions at 180° angle, 30.5 cm/minute rate, units of N/100 mm.
Adhesion values with "s" denote "shocky" or slip/stick peel behavior.

TABLE 4

180° Peel Adhesion to Plasticized Vinyl Substrate with 80/20 PVDF/PMMA Top Surface Adhesives with different amounts of NNDMA

| Ex. | Adhesive | % NNDMA | Tg °C. | 24 Hour CTH | 1 Week 66° C. |
|---|---|---|---|---|---|
| 1 | 52/26/20/2 EA/BA/NNDMA/AA | 20 | −15 | 12s | 184 |
| 2 | 62/26/10/2 EA/BA/NNDMA/AA | 10 | −23 | 88 | 107 |
| 3 | 67/26/5/2 EA/BA/NNDMA/AA | 5 | −27 | 88 | 102 |

TABLE 4-continued

180° Peel Adhesion to Plasticized Vinyl Substrate with 80/20 PVDF/PMMA Top Surface Adhesives with different amounts of NNDMA

| Ex. | Adhesive | % NNDMA | Tg °C. | 24 Hour CTH | 1 Week 66° C. |
|---|---|---|---|---|---|
| 4 | 76/26/2 EA/BA/AA | 0 | −30 | 81 | 104 |
| 5 | 30/50/18/2 MA/BA/NNDMA/AA | 18 | −15 | 83s | 211 |
| 6 | 20/60/18/2 MA/BA/NNDMA/AA | 18 | −22 | 93 | 123 |
| 7 | 30/55/13/2 MA/BA/NNDMA/AA | 13 | −21 | 90 | 112 |
| 8 | 38/50/10/2 MA/BA/NNDMA/AA | 10 | −19 | 88 | 112 |

All adhesions at 180° angle, 30.5 cm/minute rate, units of N/100 mm.
Adhesion values with "s" denote "shocky" or slip/stick peel behavior.

Adhesive were made with other amide functional monomers besides N,N-dimethylacrylamide (NNDMA). These included N-vinyl pyrollidone (NVP) and N-octylacrylamide (NOAcm). The adhesion values are listed in Table 5. The highly preferred adhesive composition contains the tertiary amide NNDMA.

TABLE 5

180° Peel Adhesion to Plasticized Vinyl Substrate with 80/20 PVDF/PMMA Top Surface Adhesives with different amide functional monomers

| Ex. | Adhesive | Tg °C. | 24 Hr CTH | 1 Wk 66° C. |
|---|---|---|---|---|
| 1 | 52/26/20/2 EA/BA/NNDMA/AA | −15 | 12s | 184 |
| 9 | 78/20/2 BA/NNDMA/AA | −32 | 74 | 100 |
| 10 | 52/26/20/2 EA/BA/NVP/AA | −15 | 12s | 165 |
| 11 | 78/20/2 BA/NVP/AA | −33 | 79 | 104 |
| 12 | 85/10/5 BA/NVP/AA | −39 | 72s | 79 |
| 13 | 85/10/5 2-MBA/NVP/AA | −17 | 72s | 84 |
| 14 | 52/26/20/2 EA/BA/NOAcm/AA | −36 | 21s | 109 |

All adhesions at 180° angle, 30.5 cm/minute rate, units of N/100 mm.
Adhesion values with "s" denote "shocky" or slip/stick peel behavior.

Table 6 shows adhesion values of the NNDMA containing adhesive to various fluoropolymers (substituting for layers 3 and 4 in FIG. 1). The Dyneon THV 500 fluoropolymer contains less vinylidene fluoride monomer and more perfluorinated monomer than the Dyneon THV 200 fluoropolymer, hence, lower heat age or ultimate adhesion build. The Dyneon FEP T-100 is a plastic consisting of 100% perfluoroinated monomers and the ETFE is a copolymer of ethylene and perfluorinated monomer (tetrafluoroethylene). There was little or no adhesion build against both polymers which are not derived from hydrofluorinated monomers. Again, against the TEDLAR plastic, which is a hydrofluoropolymer, high adhesion build was obtained when heat aged.

TABLE 6

180° Peel Adhesion to Various Fluoropolymer Containing Plastics

| Ex. | Adhesive | Plastic | 24 Hour CTH | 1 Week 66° C. |
|---|---|---|---|---|
| 1 | 52/26/20/2 EA/BA/NNDMA/AA | Dyneon THV 500 | <10 | 70 |
| 1 | 52/26/20/2 EA/BA/NNDMA/AA | Dyneon THV 200 | <10 | 130 |
| 1 | 52/26/20/2 EA/BA/NNDMA/AA | Dyneon FEP T-100 | <10 | <10 |
| 1 | 52/26/20/2 EA/BA/NNDMA/AA | Dyneon 6235J ETFE | <10 | <10 |
| 1 | 52/26/20/2 EA/BA/NNDMA/AA | TEDLAR | 30 | 160 |

All adhesions at 180° angle, 30.5 cm/minute rate, units of N/100 mm.
Adhesion values with "s" denote "shocky" or slip/stick peel behavior.

Besides adhesion to hydrofluoropolymer surfaces, and blends of these with other polymers, the NNDMA adhesives exhibit a high bonding affinity to polycarbonate plastics. Polycarbonate is classically not defined as a low energy surface, but does exhibit such qualities when acrylic PSA's are applied to this type of plastic. The data in Table 7 illustrates the difference in adhesion, especially upon heat aging, between adhesives with amide functional monomers and the control sample having only acid functionality. Again, the linear, tertiary amides, such as NNDMA, are highly preferred, but secondary and cyclic amides, such as NVP, NOAcm, and NVC, are also useful.

TABLE 7

180° Peel Adhesion to Polycarbonate Plastic

| Example | Adhesive | Tg °C. | 24 Hour CTH | 1 Week 66° C. |
|---|---|---|---|---|
| C | 90/10 2-MBA/AA | −20 | 51s | 79 |
| 1 | 52/26/20/2 EA/BA/NNDMA/AA | −15 | 46s | 211 |
| 3 | 67/26/5/2 EA/BA/NNDMA/AA | −27 | 77 | 158 |
| 5 | 30/50/18/2 MA/BA/NNDMA/AA | −15 | 74 | 211 |
| 8 | 38/50/10/2 MA/BA/NNDMA/AA | −19 | 92 | 211 |
| 9 | 78/20/2 BA/NNDMA/AA | −32 | 106 | 139 |
| 11 | 78/20/2 BA/NVP/AA | −33 | 125 | 118 |

TABLE 7-continued

180° Peel Adhesion to Polycarbonate Plastic

| Example | Adhesive | Tg ° C. | 24 Hour CTH | 1 Week 66° C. |
|---|---|---|---|---|
| 12 | 85/10/5 BA/NVP/AA | −33 | 67 | 113 |
| 14 | 52/26/20/2 EA/BA/NoAcm/AA | −36 | 120 | 130 |
| 15 | 68/32 IOA/NVC | −24 | 113 | 121 |

All adhesions at 180° angle, 30.5 cm/minute rate, units of N/100 mm.
Adhesion values with "s" denote "shocky" or slip/stick peel behavior.

Table 8 shows that the EA/BA/NNDMA/AA adhesive also maintains an adhesive bond to highly plasticized substrates such Duraskin 070 Blue PVC Coated Polyester Style #B129334 from Verseidag of Krefeld, Germany.

TABLE 8

T-Peel Adhesion to Duraskin 070 Blue PVC Coated Style #B129334

| Example | Adhesive | 24 Hour CTH | 1 Week 66° C. | 3 Weeks 66° C. |
|---|---|---|---|---|
| 1 | 52/26/20/2 EA/BA/NNDMA/AA | 2.3 | 2.5 | 3.3 |

All adhesions measured by T-Peel Method, 30.5 cm/minute rate, units of N/100 mm.

Each of the patents, patent applications, and publications cited herein are incorporated herein by reference, as if individually incorporated. Various modifications and alterations of this invention will become apparent to those skilled in the art without departing from the scope and spirit of the invention. It should be understood that this invention is not limited to the illustrative embodiments set forth herein.

What is claimed is:

1. A pressure sensitive adhesive comprising a copolymer comprising:
    at least one copolymerized monoethylenically unsaturated (meth)acrylic acid ester comprising an alkyl group having at least 4 carbons on average;
    at least one copolymerized monoethylenically unsaturated (meth)acrylic acid ester comprising an alkyl group having less than 4 carbons on average and which has a Tg of less than 50° C. as a homopolymer; and
    greater than 10 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group;
    wherein the pressure sensitive adhesive is removable, repositionable, or both within an initial period of about 24 hours and has a Tg of no greater than −15° C.

2. The pressure sensitive adhesive of claim 1 wherein the monoethylenically unsaturated (meth)acrylic acid ester comprising an alkyl group having at least 4 carbons has a Tg of less than about 0° C. as a homopolymer, and the monoethylenically unsaturated (meth)acrylic acid ester comprising an alkyl group having less than 4 carbons has a Tg of less than 50° C. as a homopolymer.

3. The pressure sensitive adhesive of claim 1 wherein a 50-micron thick polymeric plasticized vinyl film having a 35-micron thick layer of the adhesive disposed thereon has a 180° peel adhesion value of no greater than about 35 N/100 mm, measured at a 30.5 cm per minute peel rate, from a surface comprising an 80/20 polyvinylidenefluoride/polymethylmethacrylate blend after contact for 24 hours at 22° C.

4. The pressure sensitive adhesive of claim 3 wherein a 50-micron thick polymeric plasticized vinyl film having a 35-micron thick layer of the adhesive disposed thereon has a 180° peel adhesion value of at least about 70 N/100 mm, measured at a 30.5 cm per minute peel rate, from a surface comprising an 80/20 polyvinylidenefluoride/polymethylmethacrylate blend after contact for 7 days at 66° C.

5. The pressure sensitive adhesive of claim 1 wherein the amount of copolymerized monethylenically unsaturated (meth)acrylic acid ester comprising an alkyl group having at least 4 carbon atoms on average is at least about 5 parts to no greater than about 95 parts by weight, based on the total weight of monomers.

6. The pressure sensitive adhesive of claim 1 wherein the amount of copolymerized monoethylenically unsaturated (meth)acrylic acid ester comprising an alkyl group having less than 4 carbon atoms on average is no greater than about 90 parts, based on the total weight of monomers.

7. The pressure sensitive adhesive of claim 1 wherein the amount of copolymerized monoethylenically unsaturated monomer having a secondary or tertiary amide group is no greater than about 50 parts by weight, based on the total weight of monomers.

8. The pressure sensitive adhesive of claim 1 wherein the copolymer further comprises at least one copolymerized acidic monomer.

9. The pressure sensitive adhesive of claim 1 which is coated on at least one surface of a film or a foam.

10. A pressure sensitive adhesive comprising a copolymer comprising:
    at least one copolymerized monoethylenically unsaturated (meth)acrylic acid ester comprising an alkyl group having at least 4 carbons on average;
    at least one copolymerized monoethylenically unsaturated (meth)acrylic acid ester comprising an alkyl group having less than 4 carbons on average and which has a Tg of less than 50° C. as a homopolymer; and
    greater than 10 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group;

wherein all of the copolymerized monoethylenically unsaturated (meth)acrylic acid esters of the copolymer have a Tg of less than 50° C. as a homopolymer;

wherein the pressure sensitive adhesive is removable, repositionable, or both within an initial period of about 24 hours and has a Tg of no greater than −15° C.

11. A pressure sensitive adhesive comprising a copolymer comprising:

about 10 parts to about 70 parts by weight, based on the total weight of monomers, of at least one copolymerized monoethylenically unsaturated (meth)acrylic acid ester comprising an alkyl group having at least 4 carbons on average;

about 20 parts to about 80 parts by weight, based on the total weight of monomers, of at least one copolymerized monoethylenically unsaturated (meth)acrylic acid ester comprising an alkyl group having less than 4 carbons on average and which has a Tg of less than 50° C. as a homopolymer; and greater than 10 parts and up to about 50 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group;

wherein the pressure sensitive adhesive is removable, repositionable, or both within an initial period of about 24 hours and has a Tg of no greater than −15° C.

12. A pressure sensitive adhesive comprising a copolymer comprising:

at least one copolymerized monoethylenically unsaturated (meth)acrylic acid ester comprising an alkyl group having at least 4 carbons on average and which as a homopolymer has a Tg of less than about 0° C.;

at least one copolymerized monoethylenically unsaturated (meth)acrylic acid ester comprising an alkyl group having less than 4 carbons on average and which as a homopolymer has a Tg of less than 50° C.; and greater than 10 parts by weight, based on the total weight of monomers, at least one copolymerized monoethylenically unsaturated monomer having a secondary or tertiary arnide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group;

wherein a 50-micron thick polymeric plasticized vinyl film having a 35-micron thick layer of the pressure sensitive adhesive disposed thereon has a 180° peel adhesion value of no greater than about 35 N/100 mm, measured at a 30.5 cm per minute peel rate, from a surface comprising an 80/20 polyvinylidenefluoride/polymethylmethacrylate blend after contact for 24 hours at 22° C., and after 7 days at 66° C. has a 180° peel adhesion value of at least about 70 N/100 mm, measured at a 30.5 cm per minute peel rate; and wherein the pressure sensitive adhesive has a Tg of no greater than −15° C.

13. The pressure sensitive adhesive of claim 1 wherein at least one of R$^1$ or R$^2$ is a vinyl group.

14. The pressure sensitive adhesive of claim 1 wherein the monoethylenically unsaturated monomer having a secondary or tertiary amide group is selected from the group consisting of N-methyl acrylamide, N-ethyl acrylamide, N,N-dimethyl acrylamide, N,N-dimethyl methacrylamide, N,N-dimethyl acrylamide, N,N-diethyl methacrylamide, N-isopropyl acrylamide, t-butyl acrylamide, N-octyl acrylamide, 4-(N,N-dimethylamido)butylacrylate, N-vinyl pyrrolidone, N-vinyl caprolactam, N-vinyl formamide, and combinations thereof.

15. The pressure sensitive adhesive of claim 14 wherein the monoethylenically unsaturated monomer having a secondary or tertiary amide group is selected from the group consisting of N,N-dimethyl acrylamide, N,N-diethyl acrylamide, N-vinyl pyrrolidone, N-vinyl caprolactam, and combinations thereof.

16. The pressure sensitive adhesive of claim 1 wherein the saturated or unsaturated hydrocarbon moiety forms a ring with the carbonyl carbon of the amide group.

17. A pressure sensitive adhesive comprising a copolymer comprising:

at least one copolymerized monoethylenically unsaturated (meth)acrylic acid ester comprising an alkyl group having at least 4 carbons on average;

at least one copolymerized monoethylenically unsaturated (meth)acrylic acid ester comprising an alkyl group having less than 4 carbons on average; and greater than 10 parts by weight, based on the total weight of monomers, of at least one copolymerized monoethylenically unsaturated monomer having a secondary or tertiary amide group selected from the group consisting of N,N-dimethyl acrylamide, N,N-diethyl acrylamide, N-vinyl pyrrolidone, and N-vinyl caprolactam, and combinations thereof;

wherein all of the copolymerized monoethylenically unsaturated (meth)acrylic acid esters of the copolymer have a Tg of less than 50° C. as a homopolymer; and wherein the pressure sensitive adhesive has a Tg of no greater than −15° C.

18. A pressure sensitive adhesive comprising a copolymer comprising:

at least one copolymerized monoethylenically unsaturated (meth)acrylic acid ester comprising an alkyl group having at least 4 carbons on average having a Tg of less than 0° C. as a homopolymer;

at least one copolymerized monoethylenically unsaturated (meth)acrylic acid ester comprising an alkyl group having less than 4 carbons on average having a Tg of less than 50° C. as a homopolymer; and greater than 10 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group;

wherein a 50-micron thick polymeric plasticized vinyl film having a 35-micron thick layer of the adhesive disposed thereon has a 180° peel adhesion value of no greater than about 35 N/100 mm, measured at a 30.5 cm per minute peel rate, from a surface comprising an 80/20 polyvinylidenefluoride/polymethylmethacrylate blend after contact for 24 hours at 22° C.; and wherein the pressure sensitive adhesive has a Tg of no greater than −15° C.

19. A pressure sensitive adhesive comprising a copolymer comprising:
- at least one copolymerized monoethylenically unsaturated (meth)acrylic acid ester comprising an alkyl group having at least 4 carbons on average having a Tg of less than 0° C. as a homopolymer;
- at least one copolymerized monoethylenically unsaturated (meth)acrylic acid ester comprising an alkyl group having less than 4 carbons on average having a Tg of less than 50° C. as a homopolymer; and
- greater than 10 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group;
- wherein a 50-micron thick polymeric plasticized vinyl film having a 35-micron thick layer of the adhesive disposed thereon has a 180° peel adhesion value of at least about 70 N/100 mm, measured at a 30.5 cm per minute peel rate, from a surface comprising an 80/20 polyvinylidenefluoride/polymethylmethacrylate blend after contact for 7 days at 66° C.; and
- wherein the pressure sensitive adhesive has a Tg of no greater than −15° C.

20. A pressure sensitive adhesive comprising a copolymer comprising:
- at least one copolymerized monoethylenically unsaturated (meth)acrylic acid ester comprising an alkyl group having at least 4 carbons on average;
- at least one copolymerized monoethylenically unsaturated (meth)acrylic acid ester comprising an alkyl group having less than 4 carbons on average and which has a Tg of less than 50° C. as a homopolymer; and
- greater than 10 parts by weight, based on the total weight of monomers, of at least one copolymerized monoethylenically unsaturated monomer having a secondary or tertiary amide group of the formula —C(O)NR$^1$R$^2$ wherein R$^1$ and R$^2$ are each independently H or a saturated or unsaturated hydrocarbon moiety, which optionally forms a ring with the carbonyl carbon (—C(O)) of the amide group, and further wherein at least one of R$^1$ or R$^2$ is a vinyl group; and
- wherein the pressure sensitive adhesive has a Tg of no greater than −15° C.

* * * * *